Jan. 18, 1938.   C. S. BURDSAL ET AL   2,105,967
FLUID METER
Filed July 30, 1936   3 Sheets-Sheet 1
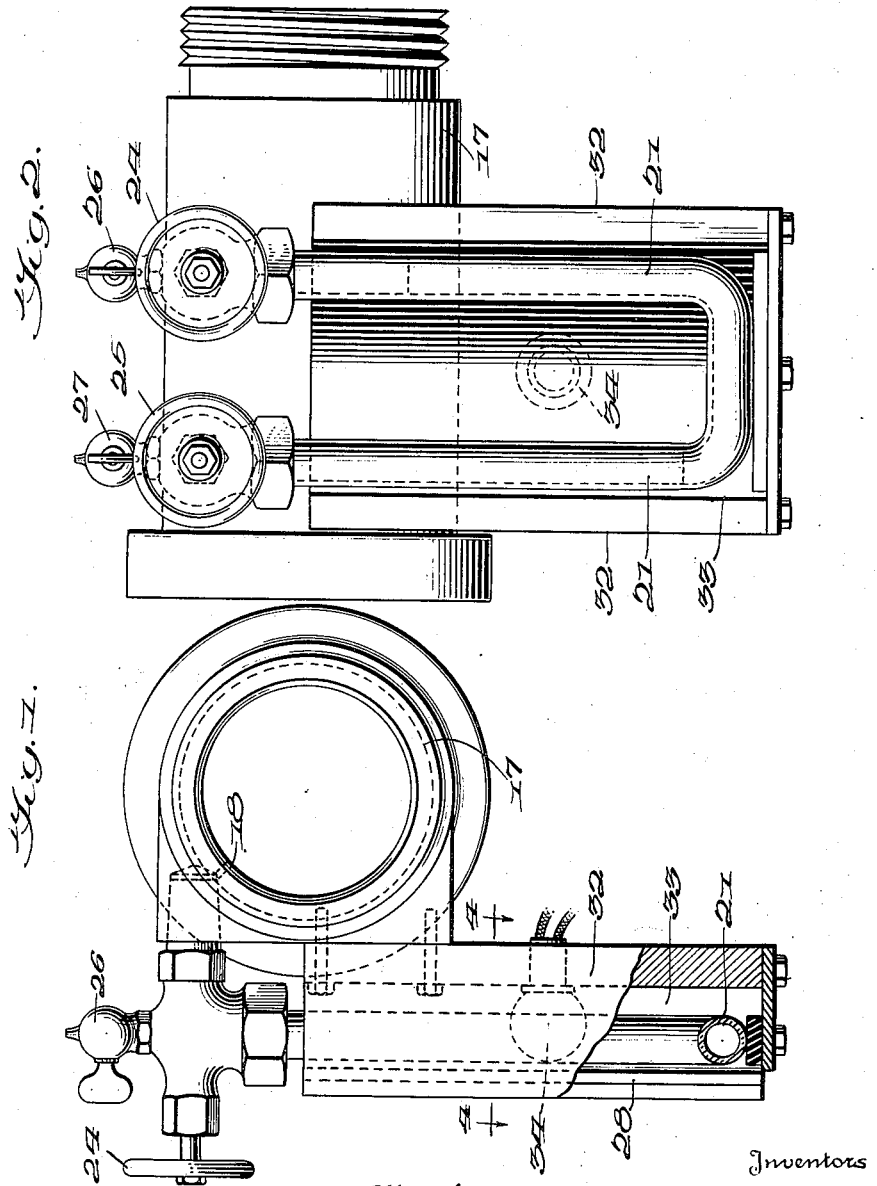
Inventors
Charles Southard Burdsal,
& Ralph E. W. Titel
By Kimmel & Crowell
Attorneys

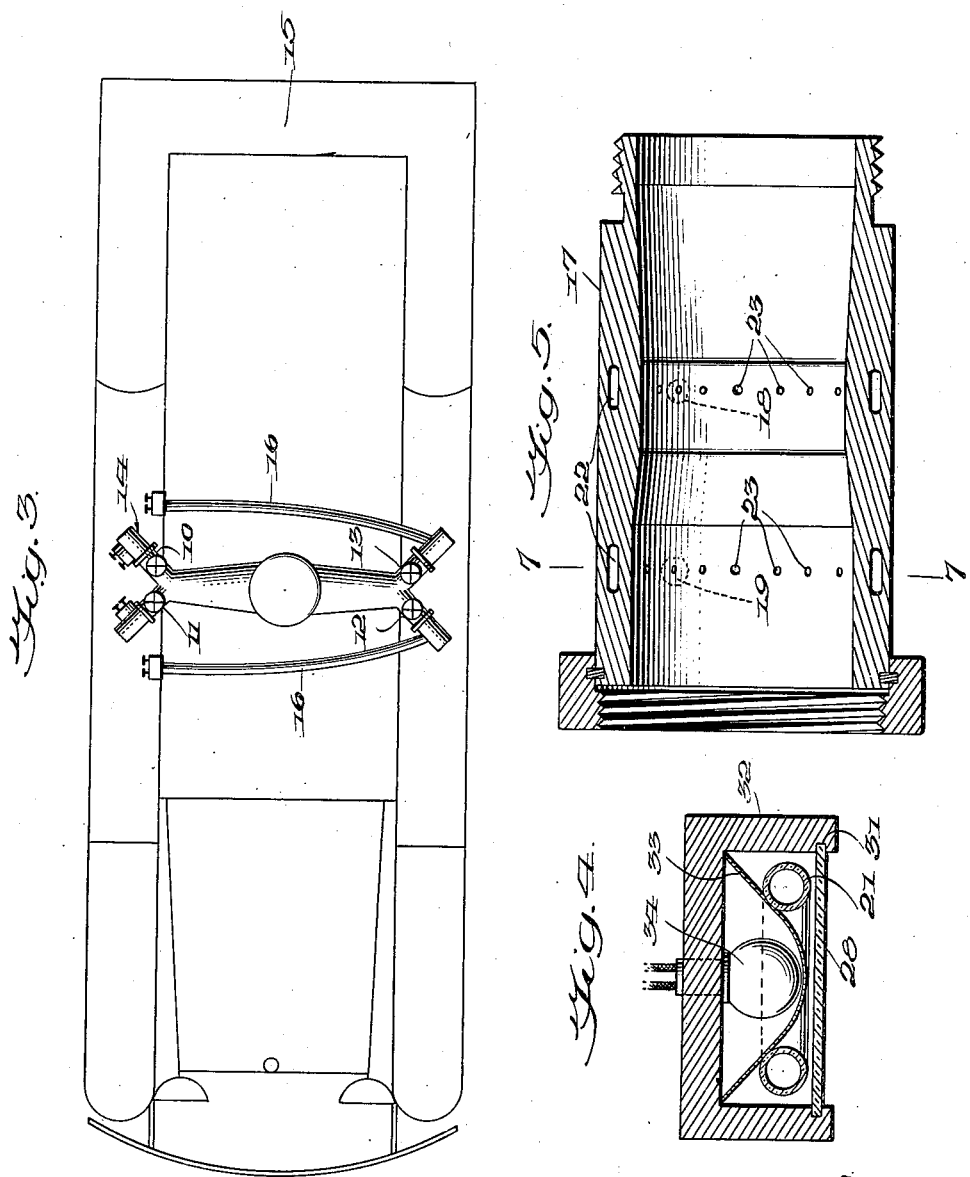

Jan. 18, 1938.　　　C. S. BURDSAL ET AL　　　2,105,967
FLUID METER
Filed July 30, 1936　　　3 Sheets-Sheet 3
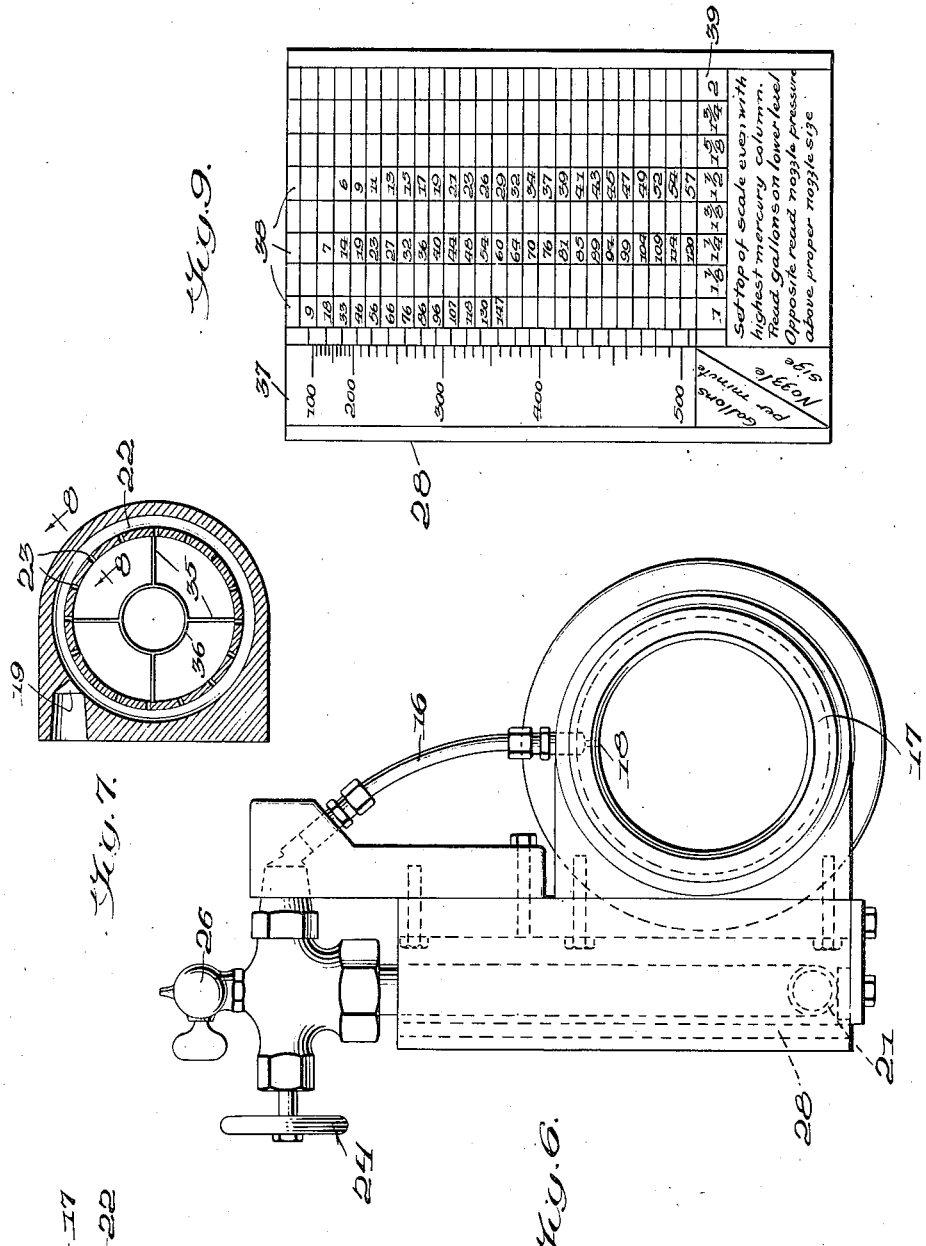

Patented Jan. 18, 1938

2,105,967

UNITED STATES PATENT OFFICE 2,105,967

FLUID METER

Charles Southard Burdsal and Ralph Ernst William Titel, Phoenix, Ariz., assignors of fifty-one percent to said Burdsal and forty-nine percent to said Titel Application July 30, 1936, Serial No. 93,510

2 Claims. (Cl. 73—213)

This invention relates to a meter structure designed primarily for use in connection with a fire fighting equipment including a pumping apparatus supplying liquid by a flexible hose line of variable length to a nozzle; but it is to be understood that a meter structure, in accordance with this invention, is for use in any connection for which it may be found applicable, and the invention has for its object to provide, in a manner as hereinafter set forth, a meter structure for indicating the flow of the fluid.

A further object of the invention is to provide, in a manner as hereinafter set forth, a meter structure for the purpose referred to for automatically indicating to an operator the flow of a fluid to determine whether or not the flow should be regulated.

The above and other objects will be made apparent throughout the further description of the invention when taken in connection with the accompanying drawings wherein like reference characters refer to like parts. It is to be distinctly understood that the drawings are not a definition of the invention, but illustrate one form of a structure by which the invention may be carried out.

In the drawings:—

Figure 1 is a side elevational view partly in section of a meter embodying the invention, Figure 2 is a front elevational view of the meter shown in Figure 1 with the chart element removed, Figure 3 is a top plan view of a fire engine embodying the invention, Figure 4 is a sectional view taken along the line 4—4 of Figure 1, Figure 5 is a vertical sectional view of a Venturi tube forming a part of the meter, Figure 6 is a side elevational view similar to Figure 1 showing a slightly different embodiment of the invention, Figure 7 is a sectional view taken along the line 7—7 of Figure 5 showing a stream straightening device in association therewith, Figure 8 is a sectional view taken along the line 8—8 of Figure 7, and Figure 9 is a front elevation of the chart element forming a part of the invention.

The purpose of the present invention is to provide a meter structure adapted to be located in the water line of a fire hose that will indicate to the operator of the fire engine the nozzle pressure of the fire hose. The meter structure is preferably located or inserted between the discharge pipe from the fire truck pump and fire hose. Usually the fire engine has a plurality of discharge pipes associated with the pump as in Figure 3 there are shown four separate discharge pipes 10, 11, 12 and 13. A meter structure, in accordance with this invention is indicated in its entirety by 14 and is employed in connection with each discharge pipe. That is to say an independent meter structure 14 is provided for each of the pipes 10, 11, 12 and 13. All of the indicating means for these meters may be located on the same side of the truck indicated in its entirety by 15 by means of tubes 16 as will hereinafter be described.

The meter structure is of the Venturi type and it includes a Venturi tube of portions of different inner diameters and with one of the said portions constituting the throat of the tube. The latter is formed with two spaced rows of orifices or openings 18, 19, the former arranged forwardly and the latter rearwardly of the throat. The orifices or openings are for establishing, in connection with means to be referred to, communication between the interior of the tube 17 and the ends of a U-tube or manometer tube 21 containing a body of mercury which constitutes an indicator-means. The device is so constructed that the mercury tube and its casing may be mounted at a place remote from the tube 17 by means of small brass tubes 16 as shown in Figures 3 and 6. This renders the device practical for mounting at some point on the truck close to the operator's position in order that the operator may observe the condition of the several discharge lines provided on the truck. The present device may be built into the truck as a part of the apparatus or it may be inserted in a water line at any point for determining the flow of the water and the pressure at the nozzle of the hose.

In the form shown the tube 17 is preferably constructed as shown by Figure 7 wherein the tube casing is provided with a pair of annular spaces 22 registering with the orifices 18 and 19 in the tube 17. Each space 22 is provided with a plurality of openings 23 for connecting the annular spaces 22 with the interior of the tube 17. These annular spaces 22 are connected to the co-operating ends of the U-shaped mercury tube or manometer by means of valves 24 and 25 as clearly shown by the drawings. Each of these valves 24 and 25 is provided with an air bleeder valve shown at 26 and 27 respectively. A novel casing for mounting and supporting the mercury tube 21 is provided with means for holding an adjustable chart 28 of translucent or transparent material.

This chart is arranged to include a scale 37 for indicating the flow of water through the pipe and associated with this scale is a plurality of nozzle pressure scales 38 for indicating the nozzle pressure at various rates of flow through the pipe. Each of the scales 38 indicates the pressure at various rates of flow in a nozzle of a given size. The various nozzle sizes provided for are shown in the column 39 extending perpendicularly to the scales 38. These nozzle pressures are pre-determined by any of the well-known methods, such as the Underwriter's Formula when the flow of water is known and the size of the nozzle is known.

The scale 28, which is slidable in the grooves 31 in the casing 32, is adjusted during operation of the device so that the top or zero line of the scale registers with the height of the mercury in the highest mercury column, specifically the right hand column with respect to the scale 28 as the latter is viewed in Figure 9. The Venturi mechanism of the meter will readily operate to indicate on the scale 37 the flow of water through the hose, and by reading the appropriate scale 38 which intersects the column 39 at the point where the size of the nozzle being used is indicated, the nozzle pressure is shown at the point in alignment transversely of the chart with the rate of flow indicated on the scale 37.

Often a fire truck operator has to deal with such situations as supplying water to hoses of different elevations and lengths to give each nozzle the proper working pressure. This has beeen done heretofore purely by guess work while the present invention provides means whereby the operator can determine at a glance the nozzle pressure of the several discharge lines and adjust them to meet with the particular conditions under which they are operating.

The casing 32 of the mercury tube part of the meter is provided with a curved light diffuser 33 which may be made of frosted celluloid and arranged within the member 32 as shown. An electric light bulb 34 is positioned behind the diffuser assisting in the proper reading of the chart 28.

The purpose of the Venturi tube having annular spaces 22 is to eliminate part of the disturbing effect of the turbulence set up in the flow of the water through the tube when the gate valve is adjusted to increase or decrease the flow. The control valve may be located at any point desired with respect to the meter so as to be within reach of the operator when reading the co-operating scales associated with the meter.

There is further provided what is here termed a "stream straightener" adapted to be inserted in the Venturi tube 17 and consists of thin sheets of brass 35 held together by a circular member 36. These brass sheets or fins 35 extend longitudinally of the tube and have their end edges sharpened to a knife edge for the purpose of reducing the resistance to the water to a minimum. These fins operate to eliminate turbulence in the stream and renders the meter smoother in operation whereby a correct reading may be had. One of the straighteners embodying the elements 35 and 36 is provided in the inlet end of the Venturi tube, being of appropriate size and formed at its edges to fit in said end. One of these straighteners is shown in Figure 7.

While I have illustrated and described but certain embodiments of the invention, it will be apparent to those skilled in the art that certain changes, substitutions, modifications, additions and omissions may be made in the construction of the device without departing from the spirit and scope of the appended claims.

What we claim is:—

1. In a meter structure, a body having a Venturi passage provided with a throat and being formed therein forwardly and rearwardly relative to said throat with an annular space communicating with said passage, a vertically disposed open front casing secured to and depending from said body, an upstanding U-shaped tube arranged within, supported by the bottom of, positioned inwardly adjacent the open front of and extending above the top of said casing, an indicator within said tube in the form of a body of fluid responsive to pressure from within said passage to form it into parallel columns of different heights, a pair of spaced independent valve controlled pressure conducting means, each opening at one end into one of said spaces and at its other end into the upper end of one of the sides of said tube, and a normally stationary vertically adjustable transparent carrier slidably engaging in the body of and extending across the open front of said casing, said carrier being provided with pressure indicia coacting with the upper end of the column of greatest height of the indicator.

2. In a meter structure, a tubular body, a vertically disposed open front casing secured to and depending from said body, an upstanding U-shaped tube arranged within, supported from the bottom of and positioned inwardly adjacent the open front of the casing, an indicator within said tube in the form of a body of fluid responsive to pressure from within said tubular body to form it into parallel columns of different heights, a pair of spaced independent valve controlled pressure conducting means, each communicating at one end with the interior of the tubular body at spaced points of the latter, and at the other end with the upper ends of the sides of said U-tube, and a normally stationary vertically adjustable transparent carrier slidably engaging in the body of and extending across the open front of said casing, said carrier provided with pressure indicia coacting with the upper end of the column of greatest height of the indicator.

CHARLES SOUTHARD BURDSAL.
RALPH ERNST WILLIAM TITEL.